J. GAISER.
NON-SKID CHAIN.
APPLICATION FILED FEB. 12, 1920.

1,355,464.

Patented Oct. 12, 1920.

Witness
M. Siebler

Inventor
John Gaiser
By R. J. McCarty
his Attorney

UNITED STATES PATENT OFFICE.

JOHN GAISER, OF CENTERVILLE, OHIO.

NON-SKID CHAIN.

1,355,464. Specification of Letters Patent. Patented Oct. 12, 1920.

Application filed February 12, 1920. Serial No. 358,278.

*To all whom it may concern:*

Be it known that I, JOHN GAISER, a citizen of the United States, residing at Centerville, in the county of Montgomery and State of Ohio, have invented certain new and useful Improvements in Non-Skid Chains, of which the following is a specification.

My invention relates to new and useful improvements in non-skid chains for automobiles.

The object of the invention is to provide an efficient and durable chain for preventing the side-slipping of automobiles.

More definitely speaking the invention is an improvement of the chains now commonly in use and known generally as the "Weed" chain.

The object is accomplished by linking or connecting together the cross chains which tie or connect the longitudinal chains.

The invention more particularly described comprises the form of link or connection interposed between said cross chains as shown in the accompanying drawings.

Figure 1:
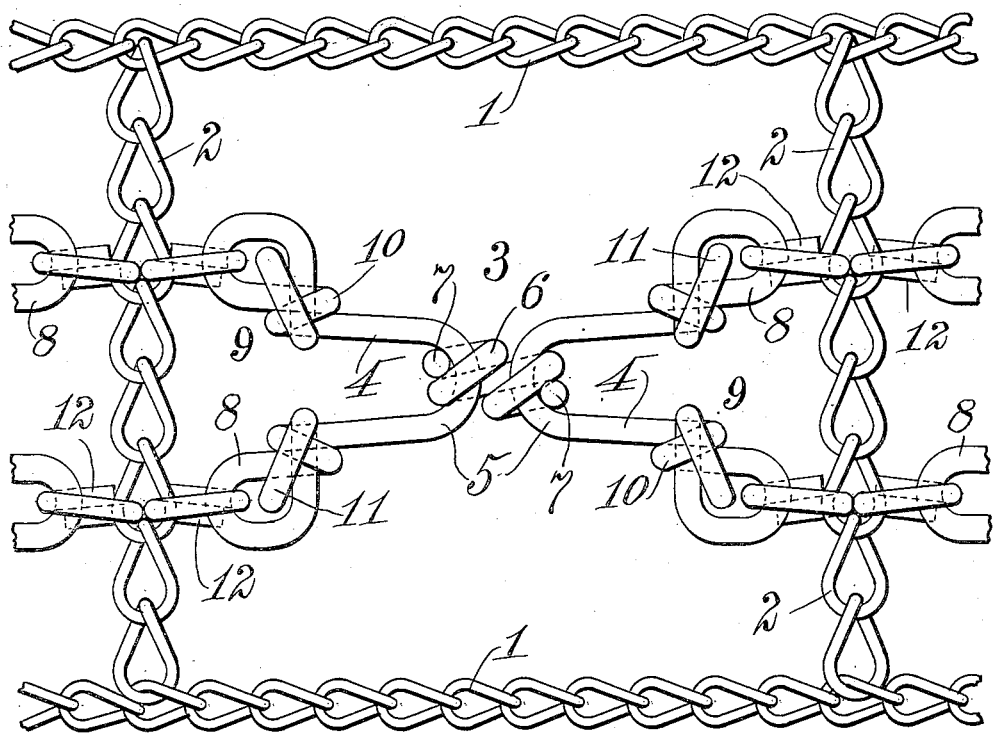
Figure 2:
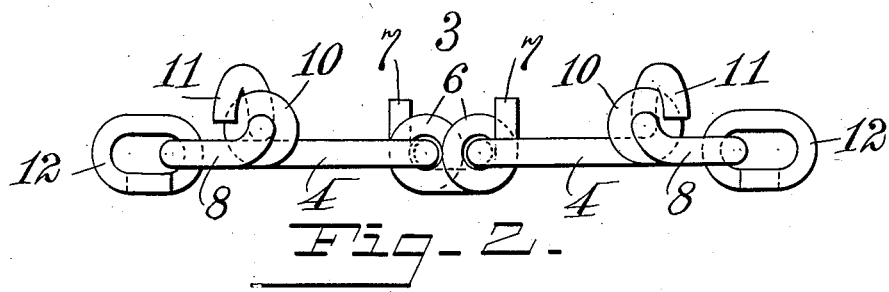

Referring to said drawings in general terms:

Figure 1 is a plan view of a portion of a non-skid chain, such as the "Weed" chain showing two of the cross chains connected by my improved connecting link, and Fig. 2 is an edge view of the connecting link detached from the chain.

The well known feature of the "non-skid" chain consists of the two longitudinal chains —1— which surround the tire (not shown) on each side, and the cross chains —2— which connect the two side chains —1— throughout the circumference of the wheel (not shown).

My improvement comprises connecting links —3— which extend between the cross chains and lie around the periphery of the tire. These connecting links owing to their peculiar construction form a series of flexible connections which conform to the contour of the tire and prevent any side slipping of the wheel or tie between the cross chains —2—. The said links or connecting members consist each of two uniformly constructed hooks or open eye members —4— which are loosely connected at their bends —5— by a double eye member —6— which is loosely twisted around said bends —5— to flexibly join the two parts. The ends —7— extending from the double eye member —6— project outwardly or in an opposite direction from the side of the link which engages the tire. It will therefore be seen that these projected ends —7— form means in addition to the other parts of the link which serve to prevent side slipping on icy roads or streets. The said ends —7— penetrate the ice or other smooth surface as the wheel turns and prevents any slipping in the rotation thereof or slipping sidewise, commonly known as "skidding." The arms of the hook or open eye members —4— spread outwardly from their smaller ends and terminate in end eyes —8—. These eyes —8— are formed by tying knots —9— in the ends, said knots being made by forming intervening eyes —10— through which the extreme ends —11— of the wire are carried and down over said eyes —10—. The eyes —10— and the turn over end —11— of the wire form additional projections which engage the smooth surfaces or icy roads and together with other features of the connecting links prevent slipping in the turn of the wheel, and skidding or sidewise slipping.

In addition to this result the cross chains —2— are also maintained in a serviceable position as the wheel turns. Owing to the spreading character of the links the cross chains are connected each at two points. These connections are made by oblong loops or eyes —12— which engage the eyes —8— and the chains —2— directly. These eyes or loops —12— are partially twisted or spiral formed in order to provide a proper link connection with a maximum of flexibility.

From the above description it will be seen that the spaces between the cross chains —2— are occupied by flexible connections which yield to the contour of the tire and most effectively engage slippery surfaces over which they pass. The surfaces of the connecting links on the side of the tire have no sharp points or edges but on the contrary they are all rounded or smooth surfaces which have no damaging effect on the tire.

Having described my invention, I claim:

1. A non-skid chain comprising longitudinal side chains, cross chains connecting said side chains, connections between said cross chains consisting of substantially U-shaped loops flexibly connected at their adjacent ends and their non-adjacent ends terminating in eyes, flexible connections between said eyes and the cross chains, the ends of said loops forming said eyes being extended above the eyes thereby forming non-skid projections, substantially as specified.

2. In a non-skid chain, the combination with side chains, and cross chains connecting said side chains, of links flexibly connected, and consisting of two members of substantially U-shape, the shanks of which are extended to form eyes in the ends thereof, the extreme ends being projected through said eyes to form non-skid projections, and loops connecting said U-shaped members to said cross chains, substantially as specified.

3. A non-skid chain for automobiles, comprising side chains, cross chains connecting said side chains, substantially U-shaped members forming links connecting said cross chains, said U-shaped members being flexibly connected at their adjacent ends by eyes which receive said adjacent ends and the ends of which terminate in spurs, the non-adjacent ends of said U-shaped members being provided with eyes terminating in spurs, and loops connecting said eyes with the cross chains, substantially as specified.

In testimony whereof I hereto affix my signature.

JOHN GAISER.